(12) United States Patent
Yamauchi et al.

(10) Patent No.: US 11,649,894 B2
(45) Date of Patent: May 16, 2023

(54) SHIFT CONTROL DEVICE

(71) Applicants: UNIVANCE CORPORATION, Kosai (JP); IKEYA FORMULA CO., LTD., Kanuma (JP)

(72) Inventors: Yoshihiro Yamauchi, Kosai (JP); Tadahiko Kato, Kosai (JP); Shinji Ikeya, Kanuma (JP); Masao Teraoka, Kanuma (JP)

(73) Assignees: UNIVANCE CORPORATION, Kosai (JP); IKEYA FORMULA CO., LTD., Kanuma (JP)

( * ) Notice: Subject to any disclaimer, the term of this patent is extended or adjusted under 35 U.S.C. 154(b) by 0 days.

(21) Appl. No.: 17/614,163

(22) PCT Filed: May 31, 2019

(86) PCT No.: PCT/JP2019/021697
§ 371 (c)(1),
(2) Date: Nov. 24, 2021

(87) PCT Pub. No.: WO2020/240814
PCT Pub. Date: Dec. 3, 2020

(65) Prior Publication Data
US 2022/0228662 A1     Jul. 21, 2022

(51) Int. Cl.
*F16H 63/32*     (2006.01)
(52) U.S. Cl.
CPC ....... *F16H 63/32* (2013.01); *F16H 2063/324* (2013.01)
(58) Field of Classification Search
CPC ............................ F16H 63/32; F16H 2063/324
(Continued)

(56) References Cited

U.S. PATENT DOCUMENTS

| | | | |
|---|---|---|---|
| 6,082,514 A * | 7/2000 | Averill | F16D 11/10 192/84.92 |
| 2014/0209398 A1* | 7/2014 | Isobe | F16H 3/10 903/902 |
| 2019/0301540 A1* | 10/2019 | Adachi | F16D 23/14 |

FOREIGN PATENT DOCUMENTS

| | | |
|---|---|---|
| DE | 10360262 A1 | 8/2005 |
| JP | 58-2031 U | 1/1983 |

(Continued)

OTHER PUBLICATIONS

Notification of Transmittal of Translation of the International Preliminary Report on Patentability (Form PCT/IB/338) issued in counterpart International Application No. PCT/JP2019/021697 dated Dec. 9, 2021 with Forms PCT/IB/373, PCT/ISA/237 and PCT/IB/326, with English translation. (10 pages).

(Continued)

*Primary Examiner* — Victor L MacArthur
(74) *Attorney, Agent, or Firm* — WHDA, LLP

(57) ABSTRACT

A sleeve in the shift control device includes a sleeve main body and a first convex section. The first convex section is annular in shape and protruded radially outward from the outer circumferential surface of the sleeve main body. The shift fork includes a fork main body, a second convex section, a ring, and a joining member. The fork main body is annular in shape and disposed radially outside the sleeve main body. The second convex section is annular in shape, axially disposed side by side with the first convex section, and protruded radially inward from the inner circumferential surface of the fork main body. The first convex section is axially sandwiched between the ring and the second convex section. The joining member is disposed in a space that is formed by a first groove formed in the ring and a second groove formed in the fork main body.

11 Claims, 4 Drawing Sheets

(58) Field of Classification Search
USPC .................................................... 74/473.37
See application file for complete search history.

(56) References Cited

FOREIGN PATENT DOCUMENTS

| | | |
|---|---|---|
| JP | 64-10822 U | 1/1989 |
| JP | 3-36559 U | 4/1991 |
| JP | 08-042689 A | 2/1996 |
| JP | 2000-009217 A | 1/2000 |
| JP | 2014-5908 A | 1/2014 |

OTHER PUBLICATIONS

International Search Report dated Sep. 3, 2019, issued in counterpart International Application No. PCT/JP2019/021697 (2 pages).
Extended (Supplementary) European Search Report dated Jan. 3, 2023, issued in counterpart application No. 19930803.2. (5 pages).

* cited by examiner

SHIFT CONTROL DEVICE

TECHNICAL FIELD

The present invention relates to a shift control device having a shift fork that moves a sleeve in an axial direction.

BACKGROUND ART

In the shift control device, upon receiving a force from a control rod, the shift fork moves the sleeve in the axial direction to select a gear. The sleeve then couples the selected gear to a clutch hub and transmits the torque of the selected gear to an output shaft (e.g., Patent Literature 1).

CITATION LIST

Patent Literature

Patent Literature 1: Japanese Unexamined Utility Model Application Publication No. 1991-36559

SUMMARY OF INVENTION

Technical Problem

However, when selecting a gear, the shift control device of the above type presses the shift fork against a part of the whole circumference of the sleeve, which is rotating. This causes a problem where the shift fork is likely to wear off.

The present invention has been made to solve the above problem. An object of the present invention is to provide a shift control device that is capable of suppressing the wear of the shift fork.

Solution to Problem

In accomplishing the above object, according to an aspect of the present invention, there is provided a shift control device including a sleeve and a shift fork. The shift fork moves the sleeve in an axial direction. The sleeve includes a sleeve main body and a first convex section. The sleeve main body is annular in shape. The first convex section is annular in shape and protruded radially outward from the outer circumferential surface of the sleeve main body. The shift fork includes a fork main body, a second convex section, a ring, and a joining member. The fork main body is annular in shape and disposed radially outside the sleeve main body. The second convex section is annular in shape, axially disposed side by side with the first convex section, and protruded radially inward from the inner circumferential surface of the fork main body. The ring is annular in shape and disposed to axially sandwich the first convex section between the ring and the second convex section. The joining member joins the ring to the fork main body. The ring is configured such that a first groove is formed in the outer circumferential surface of the ring and extended in a circumferential direction. The fork main body has a first surface and a second surface. The first surface is cylindrically shaped, connected to an axial end face of the fork main body, and larger in diameter than the inner circumferential surface of the fork main body. The second surface connects the first surface to the inner circumferential surface of the fork main body. A second groove is formed in the first surface and extended in a circumferential direction. An opening is formed to reach the second groove. In a state where the outer circumferential surface of the ring is in contact with the first surface and the axial end face of the ring is in contact with the second surface, the joining member is disposed in a space formed by the first and second grooves.

According to another aspect of the present invention, there is provided a shift control device including a sleeve and a shift fork. The shift fork is annularly shaped to move the sleeve in an axial direction. The sleeve includes a sleeve main body, a convex section, a ring, and a joining member. The sleeve main body is annularly shaped and disposed radially inside the shift fork. The convex section is annularly shaped and protruded radially outward from the outer circumferential surface of the sleeve main body. The ring is annularly shaped and disposed to axially sandwich the shift fork between the ring and the convex section. The joining member joins the ring to the sleeve main body. The ring is configured such that a first groove is formed in the inner circumferential surface of the ring and extended in a circumferential direction. The sleeve main body has a first surface and a second surface. The first surface is cylindrically shaped, connected to an axial end face of the sleeve main body, and larger in diameter than the outer circumferential surface of the sleeve main body. The second surface connects the first surface to the outer circumferential surface of the sleeve main body. A second groove is formed in the first surface and extended in a circumferential direction. An opening is formed to reach the second groove. In a state where the inner circumferential surface of the ring is in contact with the first surface and the axial end face of the ring is in contact with the second surface, the joining member is disposed in a space formed by the first and second grooves.

Advantageous Effects of Invention

The shift control device according to a first aspect of the present invention is configured such that the joining member secures the ring to the fork main body. The annular second convex section and ring of the shift fork are disposed on either axial side of the annular first convex section of the sleeve. The first convex section of the sleeve is pressed against the second convex section and ring of the shift fork. Therefore, the resulting pressure receiving area is larger than when the shift fork is pressed against a part of the whole circumference of the sleeve. This reduces the surface pressure applied to the second convex section and ring of the shift fork. Consequently, the shift control device suppresses the wear of the shift fork.

The shift control device according to a second aspect of the present invention is configured such that the opening in the fork main body is provided with a third surface and a fourth surface. The third surface and the fourth surface connect to the outer circumferential surface and axial end face of the fork main body, and circumferentially face each other. The third surface and the fourth surface connect to the first surface and the second groove.

Consequently, in addition to the advantageous effects provided by the first aspect, the shift control device makes it easy to dispose the joining member in the space formed by the first and second grooves.

The shift control device according to a third aspect of the present invention is configured such that the joining member secures the ring to the sleeve main body. The annular convex section and ring of the sleeve are disposed on either axial side of the annular shift fork. The shift fork is pressed against the convex section and ring of the sleeve. Therefore, the resulting pressure receiving area is larger than when the shift fork is pressed against a part of the whole circumference of the sleeve. This reduces the surface pressure applied to the shift fork. Consequently, the shift control device suppresses the wear of the shift fork.

The shift control device according to a fourth aspect of the present invention is configured such that a sliding member having an annular shape is positioned between the shift fork and the sleeve and disposed on an axial overlap between the shift fork and the sleeve.

The shift fork is pressed against the sleeve through the sliding member. Consequently, in addition to the advantageous effects provided by any one of the first to third aspects, the shift control device further suppresses the wear of the shift fork.

The shift control device according to a fifth aspect of the present invention is configured such that a cavity is formed in the first or second groove in a state where the joining member is disposed in the first and second grooves. Consequently, in addition to the advantageous effects provided by any one of the first to fourth aspects, the shift control device makes it easy to dispose the joining member in the space formed by the first and second grooves.

The shift control device according to a sixth aspect of the present invention is configured such that the cavity is formed in the fork main body or the sleeve main body and positioned toward an axial center relative to the joining member. Consequently, in addition to the advantageous effects provided by the fifth aspect, the shift control device prevents the ring from toppling axially outward.

The shift control device according to a seventh aspect of the present invention is configured such that first and second ends of the joining member disposed in the second groove are protruded from either end of the second groove and bent in a direction different from the direction in which the first and second grooves are extended. Consequently, in addition to the advantageous effects provided by any one of the first to sixth aspects, the shift control device ensures that the joining member is not easily separable from the second groove.

DESCRIPTION OF EMBODIMENTS

Figure 1:
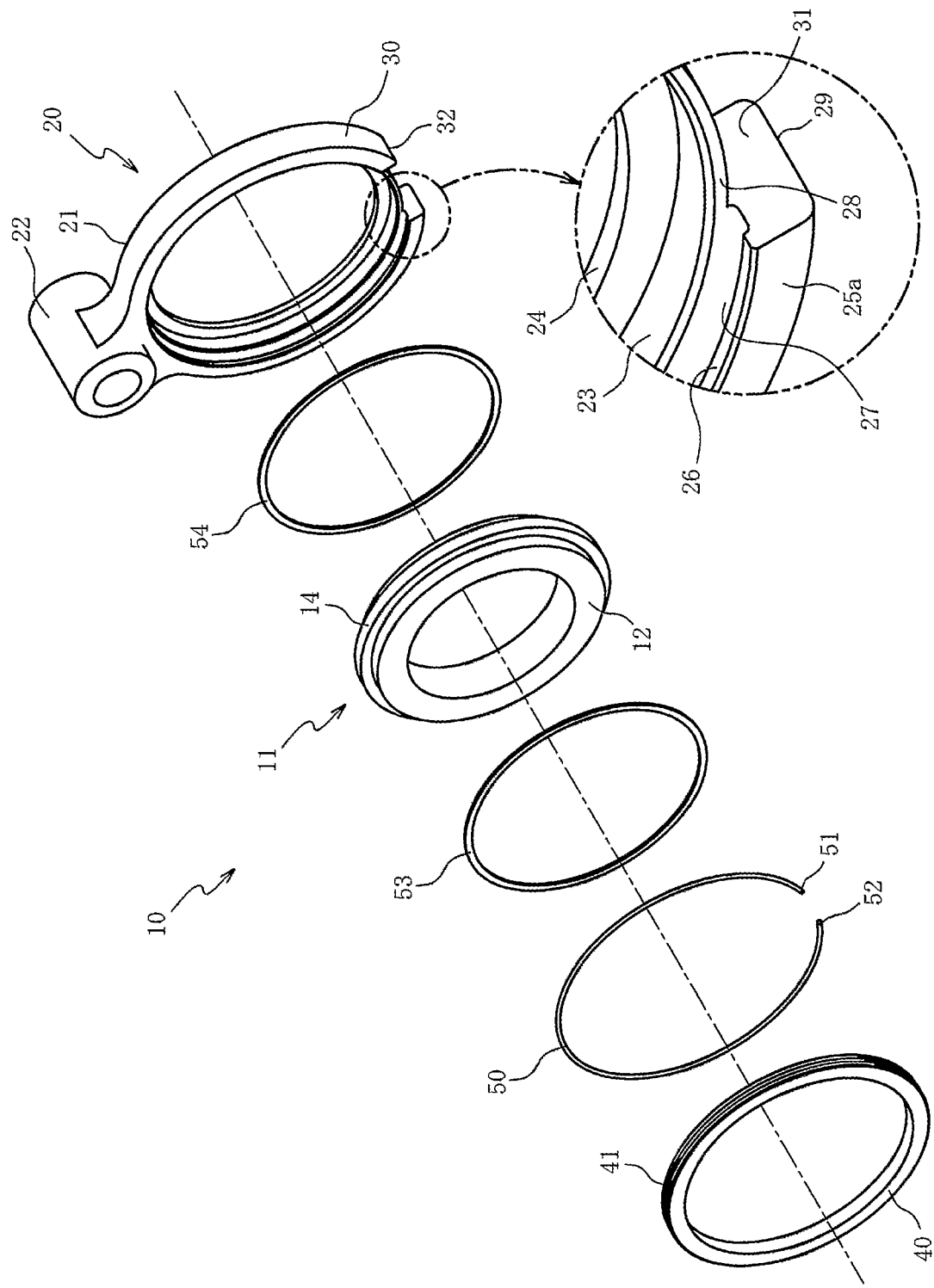
FIG. 1 is an exploded view of a shift control device according to a first embodiment of the present invention.
Figure 2:
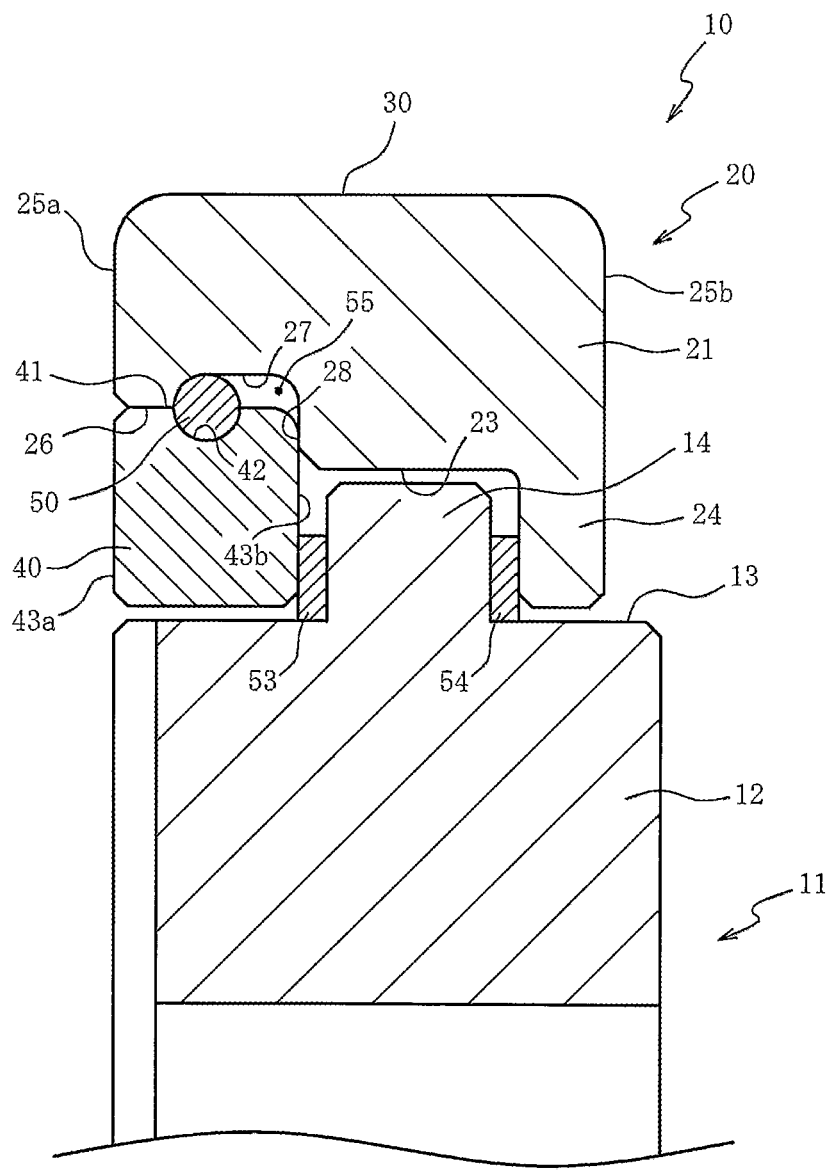
FIG. 2 is a cross-sectional view of the shift control device.

Preferred embodiments of the present invention will now be described with reference to the accompanying drawings. A shift control device 10 according to a first embodiment of the present invention is described below with reference to FIGS. 1 to 3. FIG. 1 is an exploded view of the shift control device 10. FIG. 2 is a cross-sectional view of the shift control device 10. FIGS. 1 and 2 do not depict a shaft on which a sleeve 11 is disposed and a part (e.g., a spline) of the sleeve 11 that engages with a clutch hub and a gear (the same applies to FIG. 4).

As depicted in FIGS. 1 and 2, the shift control device 10 includes the sleeve 11 and a shift fork 20. The shift fork 20 moves the sleeve 11 along an axis line O. The sleeve 11, which is made of steel, includes a sleeve main body 12 and a first convex section 14.

The first convex section 14 is annularly shaped and protruded radially outward from the outer circumferential surface 13 of the sleeve main body 12. The first convex section 14 is formed on the whole of the outer circumferential surface 13 of the sleeve main body 12.

The shift fork 20 includes a fork main body 21, a ring 40, and a wire 50. The fork main body 21 is made of steel, annular in shape, and configured such that a boss 22 is molded integrally with the fork main body 21. The ring 40 is made of steel and annular in shape. The wire 50 joins the ring 40 to the fork main body 21. A control rod (not depicted) is attached to the boss 22. The control rod is disposed in parallel with the axis line O. The fork main body 21 is disposed radially outside the sleeve main body 12. The fork main body 21 includes a second convex section 24. The second convex section 24 is annular in shape and protruded radially inward from the inner circumferential surface 23 of the fork main body 21.

The second convex section 24 is formed on the whole of the inner circumferential surface 23 of the fork main body 21. The ring 40 is axially separated from the second convex section 24. The second convex section 24 and the ring 40 are positioned on either axial side of the first convex section 14 of the sleeve 11.

A first surface 26 is formed on the fork main body 21 and connected to a first end face 25a disposed in an axial direction. The first surface 26 is cylindrical in shape and larger in diameter than the inner circumferential surface 23 of the fork main body 21. A second groove 27 is formed in the first surface 26 and extended in a circumferential direction. A second surface 28 is formed on the fork main body 21 to connect the first surface 26 to the second groove 27. The second surface 28 is perpendicular to the axis line O. In the present embodiment, the second groove 27 is extended to reach the second surface 28. The ring 40 is disposed on the first surface 26 and the second surface 28.

An opening 29 (see FIG. 1) is formed in the fork main body 21, extended to reach the second groove 27, and sandwiched between the axis line O and the opposite side of the boss 22. The opening 29 is formed in the first end face 25a, first surface 26, second groove 27, and part of the whole of an outer circumferential surface 30 of the fork main body 21. The opening 29 has a third surface 31 and a fourth surface 32. The third surface 31 and the fourth surface 32 are connected to the first end face 25a and outer circumferential surface 30 of the fork main body 21. The third surface 31 and fourth surface 32 of the fork main body 21 circumferentially face each other. The third surface 31 and the fourth surface 32 are connected to the first surface 26 and the second groove 27.

A first groove 42 (see FIG. 2) is formed on the outer circumferential surface 41 of the ring 40 and extended in a circumferential direction. In the present embodiment, the first groove 42 is a semicircular U-shaped groove. The first groove 42 is connected to the whole of the outer circumferential surface 41. The outer circumferential surface 41 of the ring 40 is slightly smaller in diameter than the first surface 26 of the fork main body 21. The axial thickness of the ring 40 is approximately equal to the axial length of the first surface 26. The distance between a second end face 43b, which is positioned in the axial direction of the ring 40, and the end of the first groove 42 that is positioned toward a first end face 43a is equal to the distance between the second surface 28 of the fork main body 21 and the end of the second groove 27 that is positioned toward the first end face

25a. The sum of the depth of the first groove 42 and the depth of the second groove 27 is approximately equal to the diameter of the wire 50.

The wire 50 is disposed in a space formed by the first groove 42 and the second groove 27 in a state where the outer circumferential surface 41 of the ring 40 is in contact with the first surface 26 of the fork main body 21 and the second end face 43b of the ring 40 is in contact with the second surface 28 of the fork main body 21. The ring 40 is secured to the fork main body 21 by the mechanical strength (shear strength and compressive strength) of the wire 50.

The wire 50 (joining member) is made of a metal material having a high shear strength, such as hard steel wire, and shaped like a coil. The wire 50 is inserted, beginning with its end, from the third surface 31 or fourth surface 32 of the fork main body 21 into the space formed by the first groove 42 and the second groove 27. The third surface 31 and the fourth surface 32 connect to the first end face 25a, outer circumferential surface 30, first surface 26, and second groove 27 of the fork main body 21, and circumferentially face each other. Therefore, the wire 50 is easily insertable into the space formed by the first groove 42 and the second groove 27 from the third surface 31 and the fourth surface 32.

In the present embodiment, the wire 50 has a circular cross-section and is wholly shaped like an approximately circular coil. The wire 50 is longer than the second groove 27. The wire 50 is disposed along the whole length of the second groove 27. However, the wire 50 is not disposed between the third surface 31 and fourth surface 32 of the first groove 42. Since the cross-section of the wire 50 is circular in shape, the wire 50 is easily insertable into the space formed by the first groove 42 and the second groove 27. Further, since the wire 50 is shaped like a coil, the wire 50 reduces the resistance encountered when the wire 50 is inserted into the grooves and ensures that the wire 50 is not easily separable after being inserted into the grooves. Furthermore, since the wire 50 is disposed along the whole length of the second groove 27 in the fork main body 21, the wire 50 increases the fall-off load of the ring 40, which is secured to the fork main body 21 by the wire 50.

Since the width of the second groove 27 is greater than the diameter of the wire 50, a cavity 55 is formed in the second groove 27 and positioned toward an axial center of the fork main body 21 (toward a second end face 25b) in a state where the wire 50 is disposed in the first groove 42 and the second groove 27. The existence of the cavity 55 further reduces the resistance encountered when the wire 50 is inserted into the grooves. Additionally, the second groove 27 having a great width absorbs error in the manufacturing of the first groove 42. This makes it easy to dispose the wire 50 in the grooves.

The cavity 55 is positioned toward an axial end of the fork main body 21 relative to the wire 50, and the wire 50 is in contact with the groove bottom of the second grove 27. This prevents the wire 50 from spreading radially outward in the cavity 55 and separating from the first groove 42. As a result, the ring 40 is properly securable to the shift fork 20 through the wire 50.

The cavity 55 is formed in the fork main body 21 and positioned toward an axial center, and the outer circumferential surface 41 of the ring 40 is in contact with the first surface 26 of the fork main body 21. Therefore, forming the cavity 55 in the above manner prevents the ring 40 from toppling axially outward. Since the first convex section 14 of the sleeve 11 and a sliding member 53 (described later) are disposed adjacent to the second end face 43b of the ring 40, forming the cavity 55 in the above manner prevents the ring 40 from toppling axially inward.

Figure 3:
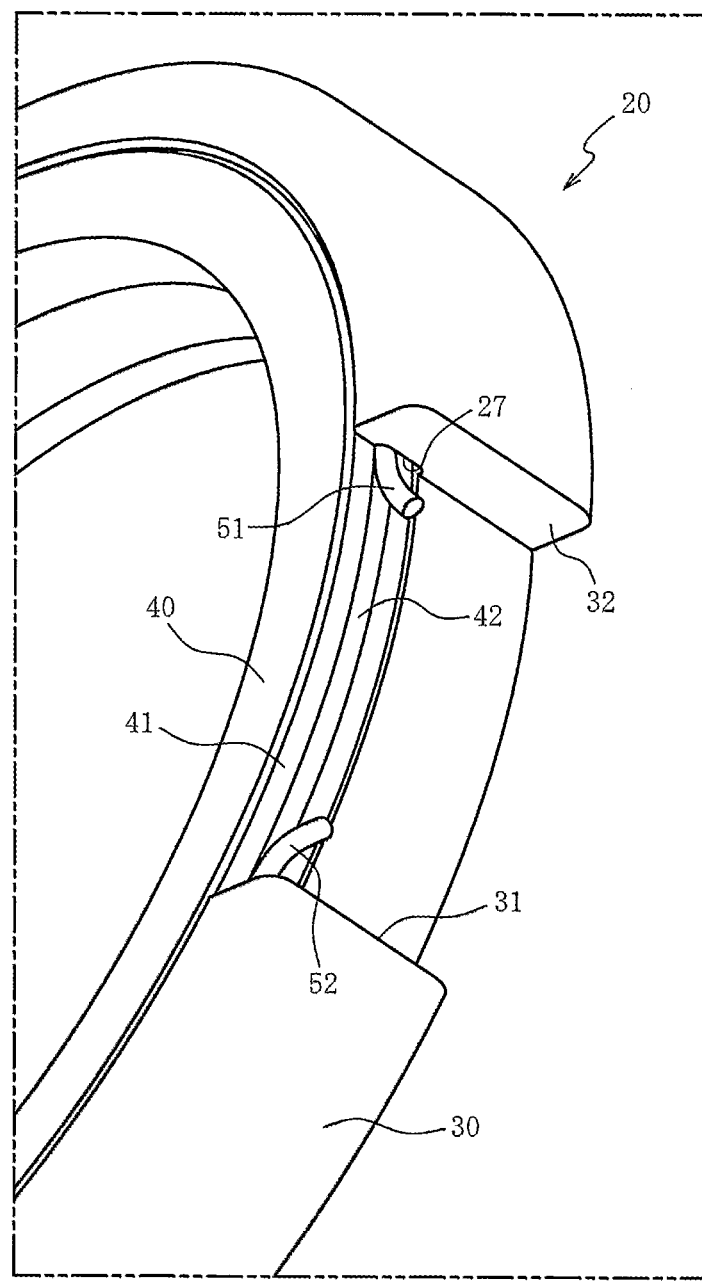
FIG. 3 is a perspective view of the shift control device.

FIG. 3 is a perspective view of the shift control device 10. A part of the shift control device 10 is depicted in FIG. 3. Since the wire 50 is longer than the second groove 27, a first end 51 and second end 52 of the wire 50 inserted into the second groove 27 protrude from either end of the second groove 27. The first end 51 and the second end 52 are bent in a direction different from the direction in which the first groove 42 and the second groove 27 are respectively extended. Bending the first end 51 and the second end 52 makes it difficult for the first end 51 and the second end 52 to move beyond the third surface 31 and the fourth surface 32. This makes it more difficult for the wire 50 to separate.

Returning to FIG. 2 for explanatory purposes, the sliding member 53 is disposed between the first convex section 14 of the sleeve 11 and the second end face 43b of the ring 40. A sliding member 54 is disposed between the first convex section 14 of the sleeve 11 and the second convex section 24 of the shift fork 20. The sliding members 53, 54 are annular members that not only provide increased wear resistance but also reduce the coefficient of friction. In the present embodiment, the sliding members 53, 54 are configured such that a surface layer (not depicted) mainly made of diamond-like carbon is formed over a base material made of steel or other metal. It should be noted that the material of the surface layer is not limited to the above-mentioned one. It is obvious that the surface layer may be made of some other material such as AlN.

The second surface 28 formed on the fork main body 21 determines the axial position of the ring 40 and thus determines the distance between the second convex section 24 and the ring 40. This provides a space for disposing the sliding members 53, 54 on either side of the first convex section 14. Further, when the axial position of the ring 40 is determined by the second surface 28, the positions of the first groove 42 and second groove 27 for disposing the wire 50 are determined. As a result, the axially outer shape of the cross-section of the space formed by the first groove 42 and the second groove 27 matches the shape of the cross-section of the wire 50. This provides good workability for inserting the wire 50.

According to the shift control device 10, the wire 50 joins the fork main body 21 to the ring 40 so that the annular second convex section 24 and the ring 40 are disposed on either axial side of the annular first convex section 14 of the sleeve 11. Since the whole circumference of the second convex section 24 and ring 40 of the shift fork 20 is pressed against the whole circumference of the first convex section 14 of the sleeve 11, the resulting pressure receiving area is larger than when the shift fork is pressed against a part of the whole circumference of the sleeve. This reduces the surface pressure applied to the second convex section 24 and ring 40 of the shift fork 20. This results in suppressing the wear of the shift fork 20.

The annular sliding members 53, 54 are positioned between the shift fork 20 and the sleeve 11 and disposed on an axial overlap between the shift fork 20 and the sleeve 11. Therefore, the shift fork 20 is pressed against the sleeve 11 through the sliding members 53, 54. The sliding members 53, 54 provide increased wear resistance.

The ring 40 is attached to the fork main body 21 of the shift fork 20, and the fork main body 21 is secured to the groove of the ring 40 by the wire 50. Therefore, the axial length of the shift control device 10 is reducible.

A configuration of a second embodiment of the present invention will now be described with reference to FIG. 4.

The first embodiment has been described on the assumption that the ring 40 is disposed on the shift fork 20. Meanwhile, the second embodiment will be described by explaining about a shift control device 60 on the assumption that a ring 80 is disposed on a sleeve 61. It should be noted that elements identical with those in the first embodiment are designated by the same reference signs as the corresponding elements and will not be redundantly described. FIG. 4 is a cross-sectional view of the shift control device 60 according to the second embodiment.

Figure 4:
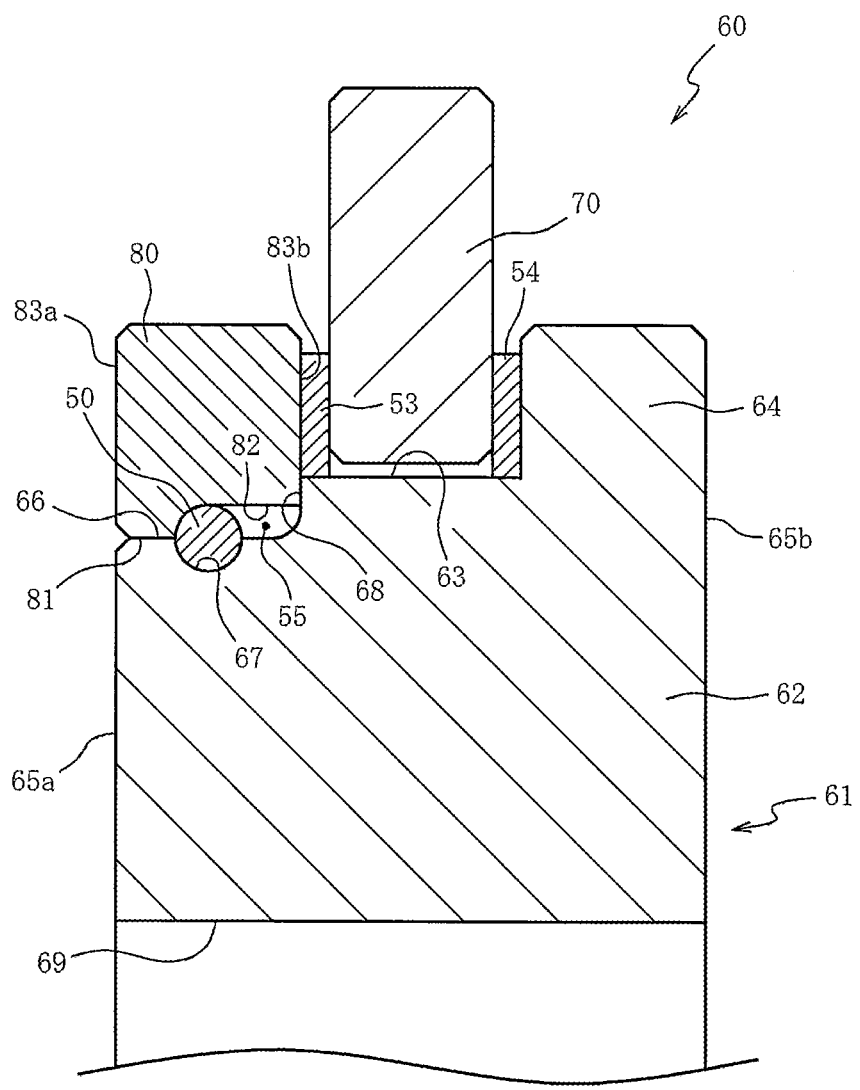
FIG. 4 is a cross-sectional view of the shift control device according to a second embodiment of the present invention.

As depicted in FIG. 4, the shift control device 60 includes the sleeve 61 and a shift fork 70 that moves the sleeve 61. The sleeve 61 includes a sleeve main body 62, a convex section 64, a ring 80, and a wire 50. The sleeve main body 62 is made of steel. The convex section 64 is made of steel, annular in shape, and protruded radially outward from the outer circumferential surface 63 of the sleeve main body 62. The ring 80 is made of steel and annular in shape. The wire 50 joins the ring 80 to the sleeve main body 62.

The sleeve main body 62 is disposed radially inside the shift fork 70, which is annular in shape. The convex section 64 is disposed on the whole of the outer circumferential surface 63 of the sleeve main body 62. The ring 80 is separated axially from the convex section 64. The convex section 64 and the ring 80 are positioned on either axial side of the shift fork 70.

A first surface 66 is formed on the sleeve main body 62 and connected to a first end face 65a disposed in an axial direction. The first surface 66 is cylindrical in shape and larger in diameter than the outer circumferential surface 63 of the sleeve main body 62. A second groove 67 is formed in the first surface 66 and extended in a circumferential direction. In the present embodiment, the second groove 67 is a semicircular U-shaped groove. A second surface 68 is formed on the sleeve main body 62 to make a stepped connection between the first surface 66 and the outer circumferential surface 63. The first surface 66 and the second surface 68 are surfaces on which the ring 80 is disposed.

An opening (not depicted) is formed in the sleeve main body 62 to permit the insertion of the wire 50. The opening is extended to connect the first end face 65a, which is disposed in the axial direction of the sleeve main body 62, and an inner circumferential surface 69 to the first surface 66 and the second groove 67. The opening in the sleeve main body 62 is formed in a part of the whole circumference of the first end face 65a, first surface 66, and second groove 67.

A first groove 82 is formed in the inner circumferential surface 81 of the ring 80 and extended in a circumferential direction. In the present embodiment, the first groove 82 is connected to a second end face 83b disposed in the axial direction of the ring 80. The first groove 82 is continuously formed in the whole of the inner circumferential surface 81. The inner circumferential surface 81 of the ring 80 is slightly larger in diameter than the first surface 66 of the sleeve main body 62. The axial thickness of the ring 80 is approximately equal to the axial length of the first surface 66. The distance between the second end face 83b disposed in the axial direction of the ring 80 and an end of the first groove 82 that is positioned toward a first end face 83a is equal to the distance between the second surface 68 of the sleeve main body 62 and an end of the second groove 67 that is positioned toward the first end face 65a. The sum of the depth of the first groove 82 and the depth of the second groove 67 is approximately equal to the diameter of the wire 50.

The wire 50 is inserted through an opening (not depicted) into a space formed by the first groove 82 and the second groove 67 in a state where the inner circumferential surface 81 of the ring 80 is in contact with the first surface 66 of the sleeve main body 62 and the second end face 83b of the ring 80 is in contact with the second surface 68 of the sleeve main body 62. The wire 50 is disposed along the whole length of the second groove 67 formed in the sleeve main body 62. This results in securing the ring 80 to the sleeve main body 62.

The width of the first groove 82 is greater than the diameter of the wire 50. Therefore, in a state where the wire 50 is disposed in the first groove 82 and the second groove 67, the cavity 55 is formed in the first groove 82 and positioned toward an axial center of the sleeve main body 62 (toward the second end face 65b). The existence of the cavity 55 further reduces the resistance encountered when the wire 50 is inserted into the grooves. Additionally, the first groove 82 having a great width absorbs error in the manufacturing of the second groove 67. This makes it easy to dispose the wire 50 in the grooves.

The cavity 55 is positioned toward an axial end of the sleeve main body 62 relative to the wire 50, and the wire 50 is in contact with the groove bottom of the first groove 82. This prevents the wire 50 from spreading radially outward in the cavity 55 and separating from the second groove 67. As a result, the ring 80 is properly securable to the sleeve 61 through the wire 50.

The cavity 55 is formed in the sleeve main body 62 and positioned toward an axial center, and the inner circumferential surface 81 of the ring 80 is in contact with the first surface 66 of the sleeve main body 62. Therefore, forming the cavity 55 in the above manner prevents the ring 80 from toppling axially outward.

Since the shift fork 70 and the sliding member 53 are disposed adjacent to the second end face 83b of the ring 80, forming the cavity 55 in the above manner prevents the ring 80 from toppling axially inward.

According to the shift control device 60, the wire 50 joins the sleeve main body 62 to the ring 80 so that the annular convex section 64 and the ring 80 are disposed on either axial side of the annular shift fork 70. Since the whole circumference of the shift fork 70 is pressed against the whole circumference of the convex section 64 and ring 80 of the sleeve 61, the resulting pressure receiving area is larger than when the shift fork is pressed against a part of the whole circumference of the sleeve. The convex section 64 and the ring 80 reduce the surface pressure applied to the shift fork 70. This results in suppressing the wear of the shift fork 70.

While the present invention has been described in terms of preferred embodiments, it will be easily understood by persons skilled in the art that the present invention is not limited to the foregoing embodiments, and that various improvements and modifications can be made without departing from the spirit and scope of the present invention. For example, the shapes of the first grooves 42, 82 and second grooves 27, 67 and the cross-sectional shape of the wire 50 can be set as appropriate.

The foregoing embodiments have been described on the assumption that the wire 50 is cited as an example of the joining member. However, the present invention is not limited to the use of such a joining member. It is obvious that other joining members may be used. The other joining members are, for example, members made of metal or synthetic resin and formed in an arc shape. The cross-sectional shape of the joining member is not limited to a circular shape and may be set as appropriate.

The first embodiment has been described with reference to a case where the wire 50 is disposed along the whole length of the second groove 27 formed in the fork main body 21, and the second embodiment has been described with reference to a case where the wire 50 is disposed along the whole length of the second groove 67 formed in the sleeve main body 62. However, the present invention is not limited to such configurations. The length of the wire 50 is set as appropriate in consideration of the fall-off load of the rings 40, 80 secured by the wire 50 and workability for inserting the wire 50. Therefore, it is obvious that the wire 50 may be shorter than the second grooves 27, 67.

The first embodiment has been described with reference to a case where the first end 51 and second end 52 of the wire 50 that are protruded from an end of the second groove 27 are bent to make it difficult for the wire 50 to separate. However, the present invention is not limited to such a configuration. The ends of the wire need not always be bent. Further, it is obvious that the ends of the wire 50 may be crimped, and that one of the ends of the wire 50 may be made larger than the associated groove. Furthermore, one of the ends of the wire 50 may be bent. The reason is that the friction of the wire 50 makes it difficult for the wire 50 to separate even when both of the first end 51 and second end 52 of the wire 50 are not bent.

The first embodiment has been described with reference to a case where the cylindrical first surface 26 is formed on the fork main body 21, and the second embodiment has been described with reference to a case where the cylindrical first surface 66 is formed on the sleeve main body 62. However, the present invention is not limited to such configurations. In the first embodiment, it is obvious that the diameter of the first surface 26 may be gradually increased with an increase in the distance from the second surface 28 and a decrease in the distance from the first end face 25*a*, and in the second embodiment, it is obvious that the diameter of the first surface 66 may be gradually decreased with an increase in the distance from the second surface 68 and a decrease in the distance from the first end face 65*a*. In such cases, the outer circumferential surface 41 of the ring 40 and the inner circumferential surface 81 of the ring 80 are formed on a conical surface corresponding to the shapes of the first surfaces 26, 66. In such cases, too, advantageous effects provided by the first and second embodiments are obtained.

The first embodiment has been described with reference to a case where the second groove 27 is wider than the first groove 42 (the cavity 55 is positioned toward the shift fork 20). However, the present invention is not limited to such a configuration. In the first embodiment, it is obvious that the first groove 42 may be wider than the second groove 27 (the cavity 55 may be positioned toward the ring 40). Similarly, although the second embodiment has been described with reference to a case where the first groove 82 is wider than the second groove 67 (the cavity 55 is positioned toward the ring 80), the present invention is not limited to such a configuration. In the second embodiment, it is obvious that the second groove 67 may be wider than the first groove 82 (the cavity 55 may be positioned toward the sleeve 61). Further, it is obvious that the size and shape of the space formed by the first and second grooves may be approximately the same as those of the wire 50 in order to avoid the formation of the cavity 55.

The foregoing embodiments have been described with reference to a case where the cavity 55 is positioned toward the axial center of the shift fork 20 or sleeve 61 relative to the wire 50. However, the present invention is not limited to such a configuration. It is obvious that, for example, the cavity 55 may be positioned axially outside or axially inside and outside the shift fork 20 or the sleeve 61 relative to the wire 50. In such cases, too, the cavity 55 reduces the resistance encountered when the wire 50 is inserted into the grooves.

The foregoing embodiments have been described with reference to a case where the cavity 55 is positioned on one axial side of the shift fork 20 or sleeve 61 relative to the wire 50. However, the present invention is not limited to such a configuration. It is obvious that the cavity 55 may be positioned radially inside and outside at least one of the shift fork 20, the sleeve 61, the rings 40, 80 relative to the wire 50 by increasing the depth of the groove bottoms of the first grooves 42, 82 and second grooves 27, 67 and making the width of the groove bottoms smaller than the diameter of the wire 50. Since the width of the groove bottoms is smaller than the diameter of the wire 50, the wire 50 will not separate from the grooves. In this case, too, the cavity 55 reduces the resistance encountered when the wire 50 is inserted into the grooves.

If, in a case where the cavity 55 is formed radially inside and outside at least one of the shift fork 20, the sleeve 61, the rings 40, 80 relative to the wire 50, a force can be applied to the wire 50 in order to increase the diameter radially outward or decrease the diameter radially inward by using the elastic force of the wire 50 while the wire 50 is disposed in a space, the width of the groove bottoms of the first grooves 42, 82 and second grooves 27, 67, which are made deeper in order to form the cavity 55, need not be smaller than the diameter of the wire 50. The reason is that the elastic force prevents the wire 50 from separating from the grooves.

The foregoing embodiments have been described with reference to a case where the cavity 55 is formed along the whole circumference of the first grooves 42, 82 and second grooves 27, 67. However, the present invention is not limited to such a configuration. It is obvious that the cavity 55 may be disposed on a part of the whole circumference of the circumference of the first grooves 42, 82 and second grooves 27, 67. The reason is that a portion having the cavity 55 reduces the resistance encountered when the wire 50 is inserted.

The first embodiment has been described with reference to a case where the second groove 27 connects to the second surface 28. However, the present invention is not limited to such a configuration. It is obvious that the width of the second groove 27 may be slightly decreased to dispose the first surface 26 between the second groove 27 and the second surface 28. Similarly, although the second embodiment has been described with reference to a case where the first groove 82 connects to the second end face 83*b*, the present invention is not limited to such a configuration. It is obvious that the width of the first groove 82 may be slightly decreased to dispose the inner circumferential surface 81 between the first groove 82 and the second end face 83*b*.

The foregoing embodiments have been described with reference to a case where the sliding members 53, 54 are disposed between the shift forks 20, 70 and the sleeves 11, 61. However, the present invention is not limited to such a configuration. It is obvious that the sliding members 53, 54 may be omitted. It is also obvious that, for example, portions acting as the sliding surfaces of the shift forks 20, 70 and sleeves 11, 61 may be induction hardened, soft nitrided, or otherwise heat-treated, hard chrome plated or otherwise plated, or coated or impregnated, for instance, with polyamide resin or fluororesin. Further, it is obvious that the portions acting as the sliding surfaces of the shift forks 20, 70 and sleeves 11, 61 may be formed, for example, by a composite material that is produced by combining an alloy with carbon fiber or other inorganic fiber.

10,60: shift control device
11,61: sleeve
12,62: sleeve main body
13,63: outer circumferential surface of the sleeve main body
14: first convex section
20,70: shift fork
21: fork main body
23: inner circumferential surface of the fork main body
24: second convex section
25a: first end face (end face of the fork main body)
26,66: first surface
27,67: second groove
28,68: second surface
29: opening
30: outer circumferential surface of the fork main body
31: third surface
32: fourth surface
40,80: ring
41: outer circumferential surface of the ring
42,82: first groove
43b,83b: second end face (end face of the ring)
50: wire (joining member)
51: first end
52: second end
53,54: sliding member
55: cavity
64: convex section
65a: first end face (end face of the sleeve main body)
81: inner circumferential surface of the ring

The invention claimed is:

1. A shift control device comprising:
a sleeve: and
a shift fork that moves the sleeve in an axial direction:
wherein the sleeve includes
a sleeve main body that is annular in shape; and
a first convex section that is annular in shape and protruded radially outward from the outer circumferential surface of the sleeve main body;
wherein the shift fork includes
a fork main body that is annular in shape and disposed radially outside the sleeve main body,
a second convex section that is annular in shape, axially disposed side by side with the first convex section, and protruded radially inward from the inner circumferential surface of the fork main body,
a ring that is annular in shape and disposed to axially sandwich the first convex section between the ring and the second convex section, and
a joining member that joins the ring to the fork main body;
where in the ring is configured such that a first groove is formed in the outer circumferential surface of the ring and extended in a circumferential direction;
wherein the fork main body includes
a first surface that is cylindrically shaped, connected to an, axial end face of the fork main body, and larger in diameter than the inner circumferential surface of the fork main body, and
a second surface that connects the first surface to the inner circumferential surface of the fork main body;
wherein a second groove is formed in the first surface and extended in a circumferential direction with an opening formed to reach the second groove; and
wherein, in a state where the outer circumferential surface of the ring is in contact with the first surface and the axial end face of the ring is in contact with the second surface, the joining member is disposed in a space formed by the first groove and the second groove.

2. The shift control device according to claim 1, wherein the opening in the fork main body is provided with a third surface and a fourth surface, the third surface and the fourth surface connecting to the outer circumferential surface and axial end face of the fork main body and cicrmferentially facing each other, and
wherein the third surface and the fourth surface connect to the first surface and the second groove.

3. The shift control device according to claim 1, further comprising:
a sliding member that is annular in shape, positioned between the shift fork and the sleeve, and disposed on an axial overlap between the shift fork and the sleeve.

4. The shift control device according to claim 1, wherein a cavity is formed in the first groove or the second groove in a state where the joining member is disposed in the first groove and the second groove.

5. The shift control device according to claim 4, wherein the cavity is formed in the fork main body or the sleeve main body and positioned toward an axial center relative to the joining member.

6. The shift control device according to claim 1, wherein the joining member disposed in the second groove includes a first end and a second end, and
wherein the first end and the second end are protruded from either end of the second groove and bent in a direction different from the direction in which the first groove and the second groove are extended.

7. A shift control device comprising:
a sleeve; and
a shift fork that is annularly shaped to move the sleeve in an axial direction;
wherein the sleeve includes
a sleeve main body that is annularly shaped and disposed radially inside the shift fork,
a convex section that is annularly shaped and protruded radially outward from the outer circumferential surface of the sleeve main body,
a ring that is annularly shaped and disposed to axially sandwich the shift fork between the ring and the convex section, and
a joining member that joins the ring to the sleeve main body;
wherein the ring is configured such that a first groove is formed in the inner circumferential surface of the ring and extended in a circumferential direction;
wherein the sleeve main body includes
a first surface that is cylindrically shaped, connected to an axial end face of the sleeve main body, and larger in diameter than the outer circumferential surface of the sleeve main body, and
a second surface that connects the first surface to the outer circumferential surface of the sleeve main body;
wherein a second groove is formed in the first surface and extended in a circumferential direction with an opening formed to reach the second groove; and.
wherein, in a state where the inner circumferential surface of the ring is in contact with the first surface and the axial end face of the ring is in contact with the second surface, the joining member is disposed in a space formed by the first groove and the second goove.

8. The shift control device according to claim 7, further comprising:

a sliding member that is annular in shape, positioned between the shift fork and the sleeve, and disposed on an axial overlap between the shift fork and the sleeve.

9. The shift control device according to claim 7, wherein a cavity is formed in the first groove or the second groove in a state where the joining member is disposed in the first groove and the second groove.

10. The shift control device according to claim 9, wherein the cavity is formed in the fork main body or the sleeve main body and positioned toward an axial center relative to the joining member.

11. The shift control device according to claim 7,
wherein the joining member disposed in the second groove includes a first end and a second end, and
wherein the first end and the second end are protruded from either end of the second groove and bent in a direction different from the direction in which the first groove and the second groove are extended.

\* \* \* \* \*